United States Patent [19]

Schmalz

[11] Patent Number: 4,606,254

[45] Date of Patent: Aug. 19, 1986

[54] ARRANGEMENT FOR MANUFACTURING CURVED WALL PORTIONS OF HEAT INSULATING WALLS

[75] Inventor: Gerhardt Schmalz, Schillerweg, Fed. Rep. of Germany

[73] Assignee: Wezel GmbH & Co. KG, Biedenkopf, Fed. Rep. of Germany

[21] Appl. No.: 678,007

[22] Filed: Nov. 30, 1984

Related U.S. Application Data

[63] Continuation-in-part of Ser. No. 277,216, Jun. 25, 1981, abandoned.

[30] Foreign Application Priority Data

| Oct. 29, 1980 | [DE] | Fed. Rep. of Germany | 3040694 |
| Dec. 15, 1980 | [EP] | European Pat. Off. | 80107904.7 |
| Jun. 26, 1981 | [ES] | Spain | 503.410 |
| Jul. 23, 1981 | [JP] | Japan | 56-114528 |

[51] Int. Cl.⁴ ............... B26D 3/28; B27B 17/02
[52] U.S. Cl. .................. 83/871; 83/435.1; 83/661; 83/810; 83/813; 83/817; 83/820; 83/874
[58] Field of Search ............ 83/871, 874, 411 R, 83/796, 810, 811, 813, 817, 820, 788, 661, 435.1

[56] References Cited

U.S. PATENT DOCUMENTS

| 846,869 | 3/1907 | Snow | 83/797 |
| 2,326,509 | 8/1943 | Womack | 83/411 R |
| 2,691,206 | 10/1954 | Kautz | 83/797 |
| 3,491,631 | 1/1970 | Skinner | 83/875 |
| 3,850,061 | 11/1974 | Wirstrom | 83/871 |
| 4,033,213 | 7/1977 | Eiselt et al. | 83/871 X |
| 4,111,085 | 9/1978 | Johnson | 83/813 X |
| 4,532,846 | 8/1985 | Schmalz | 83/796 |

Primary Examiner—Frank T. Yost
Attorney, Agent, or Firm—Michael J. Striker

[57] ABSTRACT

An arrangement for manufacturing curved wall portions of a heat insulating wall, and particularly for cutting a block of heat-insulating synthetic foam material over a contour embracing a section of a container surface to be insulated, has a chain saw with a cutting tool which slides along an outer edge of a flexible web and has a turning axes in which it is driven for running, a drive for running the cutting tool along the outer edge of the flexible web and including two rotary elements, upright guiding elements each located at a respective end of the chain saw and arranged to guide the latter for upward and downward movements between a plurality of upright positions, a drive for displacing the chain saw in an upright direction and including two displacing elements arranged to act upon a respective end of the chain saw in synchronism with one another, a drive for inclining the turning axes of the cutting tool of the chain saw relative to one another and about a horizontal axis extending in a cutting direction between a plurality of inclined positions, and a drive for moving the block in vertical and horizontal directions relative to the chain saw.

13 Claims, 4 Drawing Figures

ARRANGEMENT FOR MANUFACTURING CURVED WALL PORTIONS OF HEAT INSULATING WALLS

CROSS-REFERENCE TO RELATED APPLICATION

This application is a continuation-in-part of application Ser. No. 277,216 filed June 25, 1981, now abandoned.

BACKGROUND OF THE INVENTION

The present invention relates to the manufacturing of curved, for example cup-shaped, wall portions of heat insulating walls for insulating containers with curved surfaces, particularly for transportation and storage of liquids. More particularly, the present invention relates to a manufacturing of wall portions of heat insulating walls which include a heat insulating layer of synthetic foam material and a baffle layer, for example, a gas-tight layer, constituted of aluminum. The present invention also relates to an arrangement for manufacturing curved wall portions of the above-mentioned heat insulating walls.

Methods and arrangements for manufacturing such wall portions are known in the art. One known method of manufacturing a heat insulating wall for containers for transporting and storing liquids and gases includes the steps of forming a curved part of the insulating wall in a mold by foaming, applying a baffle layer formed as an aluminum foil onto the foam part and glueing the former to the latter in the correspondingly shaped mold, and mounting the thus-produced insulating wall on the container. This solution is, however, not satisfactory inasmuch as a plurality of the molds must be provided which considerably increases the cost of the container.

For avoiding the non-economically high mold costs, another method was proposed in the German Auslegeschrift No. 2,205,965. In accordance with the disclosed method, a flat part is cut from a plate of synthetic foam material and coated with an aluminum sheet which has the same contour and is provided with grain, grating, or wrinkle structures. The thus-cut portion coated with the aluminum sheet is pressed under the action of mass pressure in a curved (cup-shaped) mold with a curvature greater than the desired curvature of the wall part to be produced. The curved (cup-shaped) mold must be so stabilized that the aluminum foil having the grain, grating or wrinkle structure retains during closing of the press remaining elongation properties, and the profiling of the aluminum foil leads to straightening of the same. This method also possesses several disadvantages. During opening of the press, the curvature of the cut portion of the plate reduces to a certain extent, whereas during closing of the press not only the outer side of the cut portion with the aluminum foil is elongated, but also the inner side of the cut portion is compressed. The compressed inner side is not fixed in this condition, whereby during opening of the press a certain spring back takes place. The value of the spring back of the cut portion can be determined approximately only from experiments. This means that the accuracy of dimensions in the sense of the radius of curvature cannot be maintained within the required tolerances, and this problem aggravates with the reduction of the radius. It has been recognized that this method is applicable only for very great radii. Finally, in this method each radius of the wall portion requires provisions of a respective mold.

Both above-described methods possess the disadvantage in the fact that the joining edges of the wall portions do not exactly abut against one another. A wedge-shaped gap having greater or smaller width takes place, and it must be filled with a glue serving exclusively for lateral connection of the wall portions with one another. The utilization of expensive glue because of the non-uniformity of the edges of the wall portions can require several tons of glue for insulating such objects as tanks of large liquid fuel tankers.

Also, methods and arrangements for manufacturing a curved blank is disclosed in U.S. Pat. Nos. 3,491,631; 3,850,061; 4,111,085; DE-OS No. 1,906,502; DE-OS No. 2,849,254. The methods and arrangements disclosed in these patents have disadvantages in the sense that they cannot produce a curved blank with exact curvature of the spherical surface of the curved blank.

SUMMARY OF THE INVENTION

Accordingly, it is an object of the present invention to provide a method of manufacturing curved wall portions of heat insulating walls for containers with curved surfaces, such as liquid fuel tanks of tankers, which avoids the disadvantages of the prior art.

More particularly, it is an object of the present invention to provide a method of manufacturing curved wall portions with exact dimensions and in a simple and economical manner. Briefly stated, an arrangement for manufacturing wall portions of a heat insulating wall for a container, and particularly for cutting a block of heat-insulating synthetic foam material over a contour embracing a section of a container surface to be insulated, in accordance with the invention comprises a chain saw having a cutting tool which slides along an outer edge of a flexible web and has turning axes in which it is driven for sliding, means for sliding the cutting tool along the outer edge of the flexible web of the chain saw and including two rotary elements, upright guiding elements each located at a respective end of the chain saw and arranged to guide the latter for upward and downward movement between a plurality of upright positions, means for displacing the chain saw in an upright direction and including two displacing elements each arranged to act upon a respective one of the ends of the chain saw in synchronism with one another and being parallel to the guiding element, means for inclining the turning axes of the cutting tool of the chain saw relative to one another and about a horizontal axis extending in a cutting direction between a plurality of inclined positions, and means for moving the block in vertical and horizontal directions relative to the chain saw.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

A method of manufacturing curved wall portions of a heat insulating wall for a container with a curved surface, such as a cup-shaped surface, includes formation of a block of heat insulating synthetic foam material which is roughly shaped, or more particularly has a contour embracing a section of a container surface to be insulated. The block of synthetic foam material is cut over its contour so as to form a curved (cup-shaped) blank. The thus produced curved blank is coated with a baffle layer of the same contour. Finally, the thus-coated blank is cut along joining surfaces so as to produce a wall portion with its final dimensions. The original block of heat insulating synthetic plastic material may be roughly shaped as a circular segment, so that after final cutting, the wall portion is produced which is shaped as a circular segment. The baffle layer or gas-tight layer may be constituted of metal or synthetic plastic material.

Coating of the block of synthetic foam material with the layer of baffle material may be performed in different ways. For example, a piece of baffle material may be provided, then this piece is deformed so as to assume a curved shape, and thereafter the curved piece is glued to the curved blank of synthetic foam material. In constrast, the baffle layer may be assembled of a plurality of sections of baffle material which are glued onto the curved blank of synthetic foam material without deforming the former.

An equipment for manufacturing curved wall portions of a heat insulating wall for containers with curved surfaces in accordance with the present invention includes a first arrangement for cutting a curved (cup-shaped) blank of a roughly shaped block of synthetic foam material, and an arrangement for exact cutting the joining surfaces of the wall portion.

Figure 1:
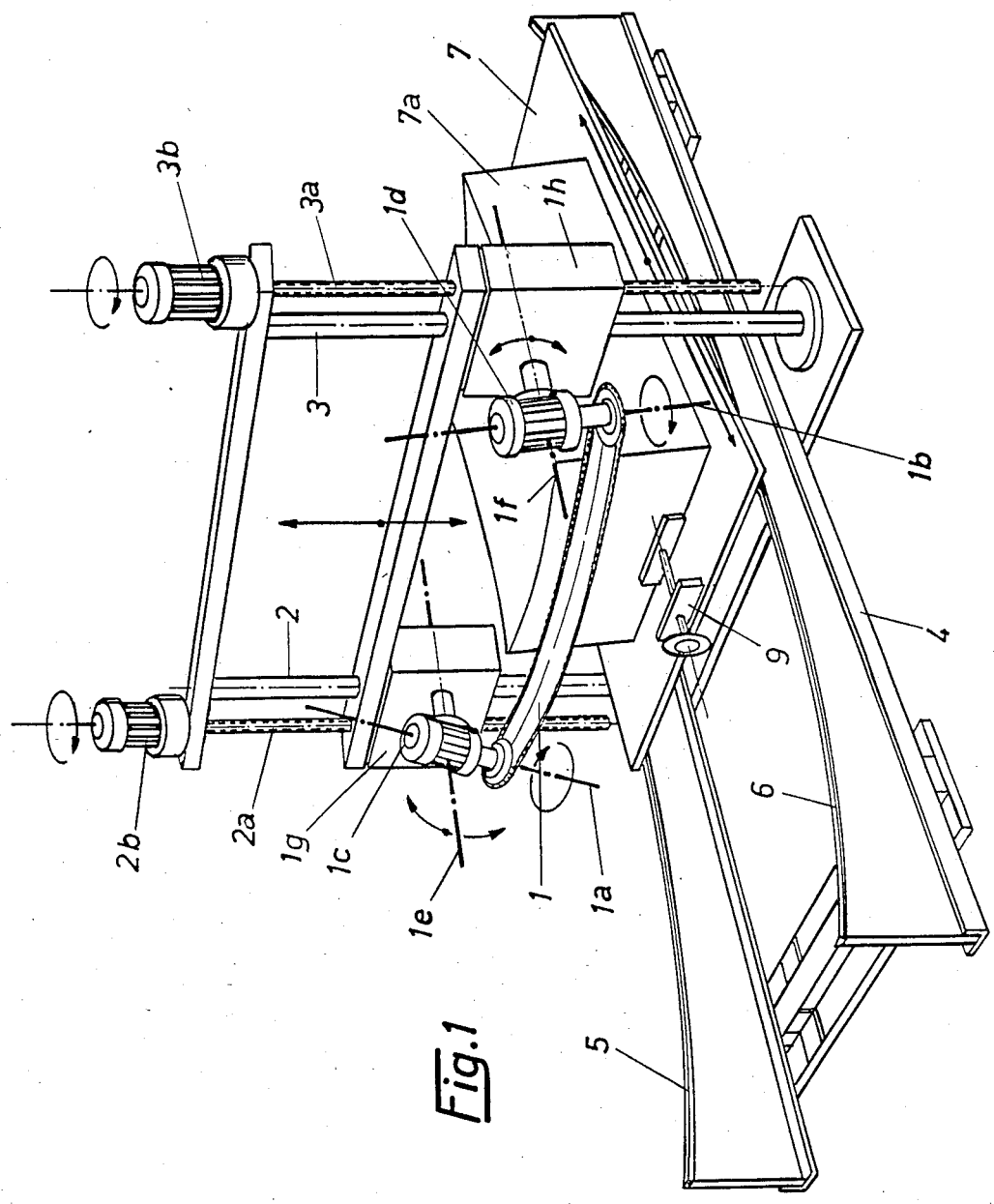
FIG. 1 is a perspective view showing an arrangement for cutting a curved (cup-shaped) blank from a block of insulating synthetic foam material, which is a part of an equipment for manufacturing curved wall portions in accordance with the present invention.
Figure 2:
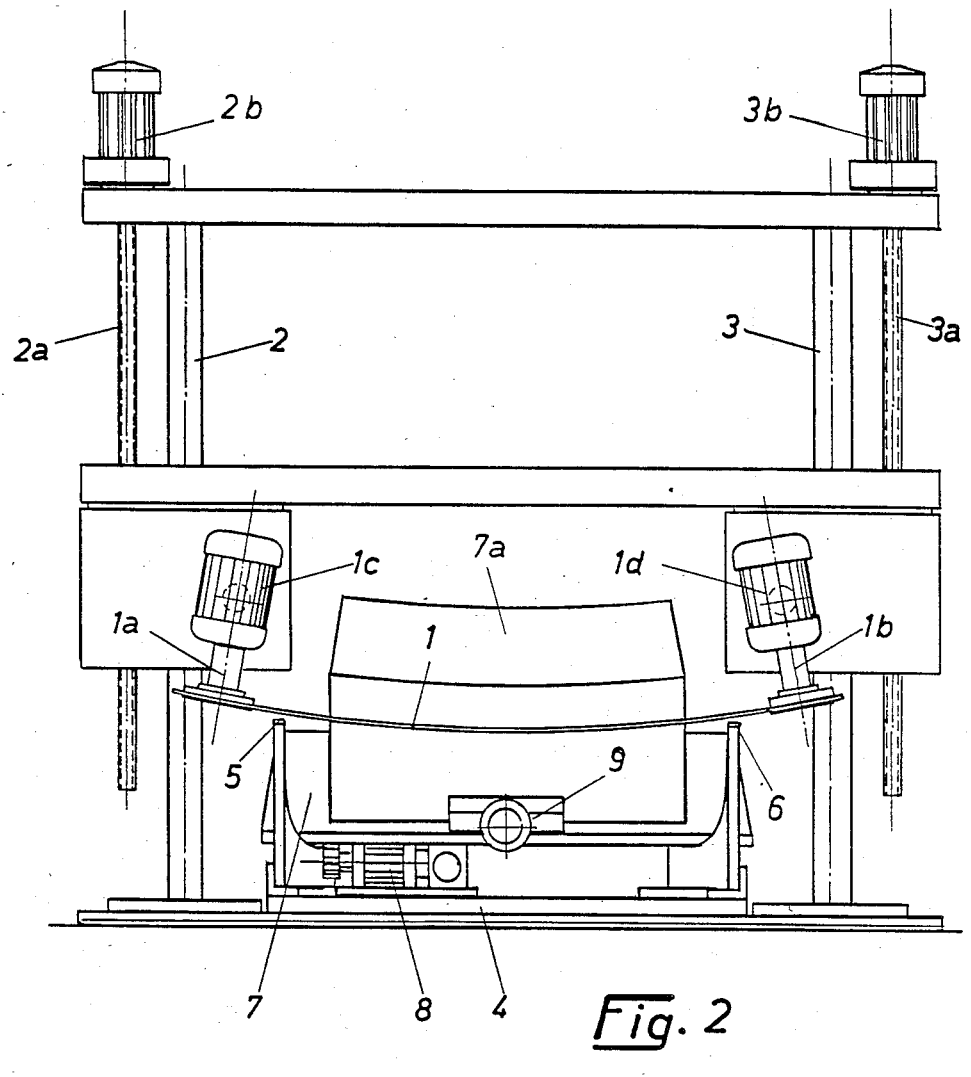
FIG. 2 is a view showing the unit of FIG. 1, as seen in a direction of cutting.
Figure 3:
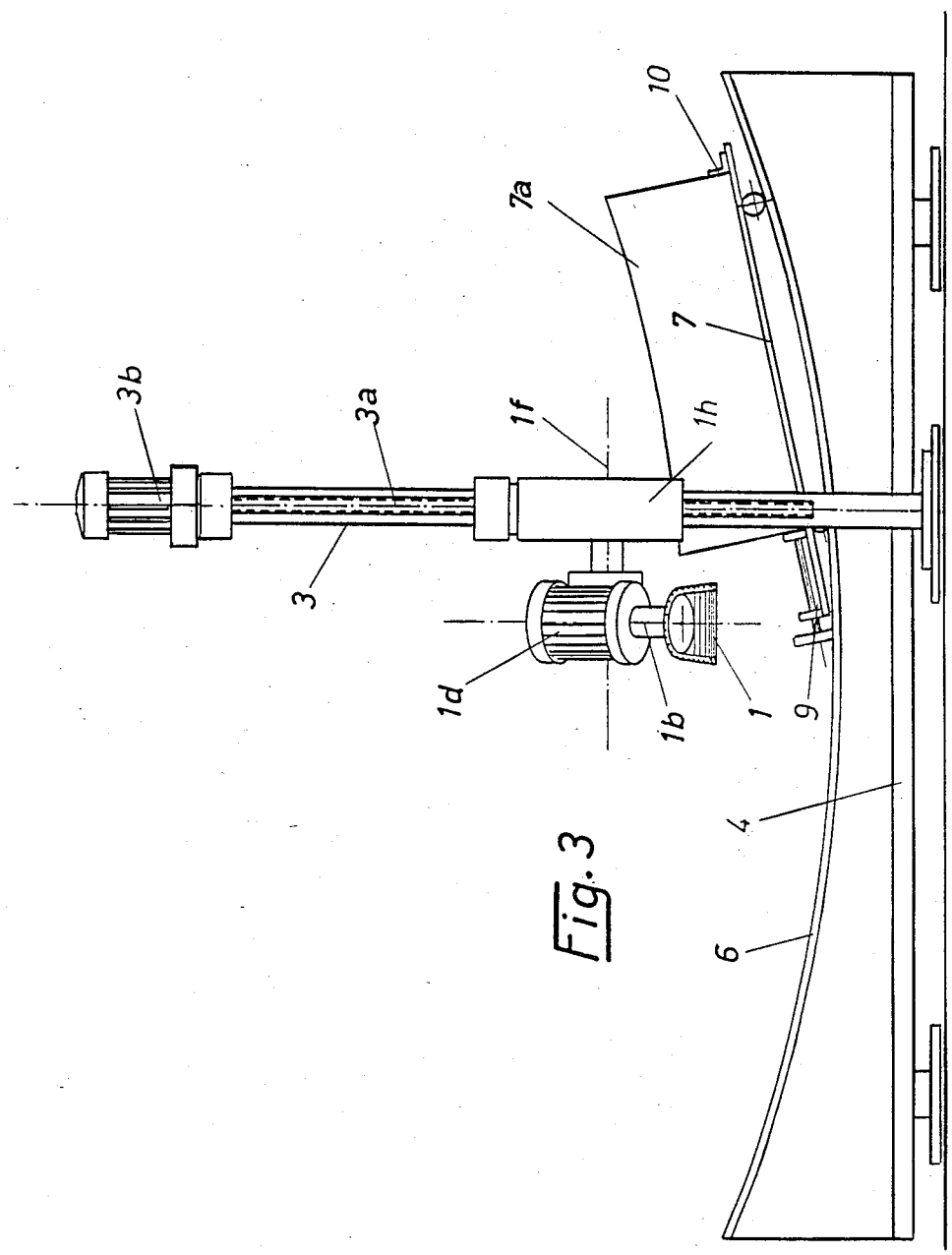
FIG. 3 is a view of the unit shown in FIG. 1, as seen in a direction which is transverse to the direction of cutting.

The first-mentioned arrangement for cutting the curved blank is shown in FIGS. 1–3 and has a chain saw 1 with a flexible web and a saw chain running along the edges of the web and driven in rotation by electric motors 1c and 1d arranged in the regions of turning axes 1a and 1b. The chain saw 1 is movably mounted with its both ends on vertical guiding bars 2 and 3 and can be fixed at each desired height.

The turning axes 1a and 1b of the chain saw 1 can be inclined relative to one another about horizontal axes of inclination 1e and 1f which are parallel to the cutting direction of the chain saw. The web of the chain saw is bendable downwardly, advantageously in the central region thereof. The turning axes 1a and 1b are turnably held in supports 1g and 1h. The turning axes 1a and 1b can be fixed in each inclined position by known means, for example by adjusting screws. A known goniometer can be used to check that both turning axes 1a and 1b have been inclined at a same angle. Thereby the chain saw assumes a cutting surface which has a curvature adjustable within certain limits and extending transverse to the cutting direction.

The upward and downward movements of the chain saw 1 along the guiding bars 2 and 3 for adjusting of the cutting height is performed with the aid of two synchronously operating spindle drives 2a and 3a driven by two synchronously operating motors 2b and 3b. A synchronizing element is located between the motors 2b and 3b. It is known per se in the art and therefore is not shown in the drawing. The spindle drives 2a and 3b extend parallel to the guiding bars 2 and 3 and are located adjacent to the latter. When the motors 2b and 3b are turned off, the chain saw 1 stops at a fixed height. It is also possible to form the above-mentioned drives as two synchronously operating cylinder-and-piston units.

The upright guiding bars 2 and 3 are arranged in the central region of longitudinal sides of a frame 4. The frame 4 carries a pair of exchangeable guiding rails 5 and 6 which extend in a longitudinal direction. A four-cornered plate 7 is provided with rollers and reciprocates with the aid of the latter on the guiding rails 5 and 6 in cutting direction of the chain saw 1 as well as upwardly and downwardly. The guiding rails 5 and 6 are curved and their curvature determines the curvature produced by the chain saw 1 in the cutting direction.

A plurality of pairs of such guiding rails 5 and 6 may be provided having different radii of curvature. The guiding rails are mounted on the frame detachably, and it is possible to mount on the frame another pair of the guiding rails having a differing radius of curvature so as to produce the curved blank 7a with the required radius of curvature.

The plate 7 is provided with means 9 for clamping a roughly shaped blank 7a of synthetic foam material. A drive is arranged on the frame 4 under the plate 7 and includes an electric motor 8 operative for reciprocating the plate 7 under the chain saw 1. The speed of movement of the plate 7 corresponds to the cutting speed of the chain saw 1. The chain saw 1 has two cutting edges. Thereby during each stroke of the plate 7 with the blank of synthetic foam material 7a under the chain saw 1, a respectively thick curved disc of the blank is cut off.

The guiding rails of this arrangement may be formed in a somewhat different way. These guiding rails may be constituted of flexible material and fixed within certain limits to each required curvature or even a straight line. As described above, the blank of synthetic foam material is reciprocable relative to the stationary cutting chain. It is also possible to support the blank stationarily and to drive the saw chain in a reciprocating movement, whereas the guiding bars may be displaced linearly in the cutting direction and perform a swinging movement for obtaining the desired curvature of the cutting surface.

This option may be designed so that the chain saw with its vertical guiding bars is suspended on horizontal guiding rails which extend through the stationary plate in the cutting direction, whereas the vertical guiding bars are suspended so as to swing in the cutting direction. In such a construction, the curved discs are again cut off from the upper side of the blank of synthetic foam material and must be removed by hand after the completion of the cut.

The clamping means for retaining the blank of synthetic foam material may be provided not below, but above the chain saw. In this case, the discs are cut off from the lower side of the blank. After the completion of each cut, the discs can follow onto a transporting element and be transported to the next working station without manual operations.

The above-described arrangement can provide for cutting not only cup-shaped blanks. It can also produce blanks having surfaces with other curved shapes, such as for example, an outer surface of a cylinder, a cone, or other rotation symmetrical bodies.

The above-described arrangement can operate, for example, in the following manner. First of all, a desired cutting radius in the arrangement is adjusted by selection of a pair of the guiding rails 5 and 6. A desired cutting radius in a direction which is transverse to the cutting direction is adjusted by adjusting the chain saw curvature or in other words by adjusting the inclination of the turning axes 1a and 2b of the chain saw 1. The height of the chain saw 1 relative to the blank 7a is then adjusted by actuation of the spindle drive 2a and 3a by first turning on of the synchronously running electric motors 2d and 3d and then turning off of these motors when the desired height has been reached. Then the electric motors 1c and 1d of the chain saw 1 are turned on, and also the electric motor 8 for moving the table blade 7 with the blank 7a is turned on, so that a cup-shaped curved plate is cut out from the blank 7a. Then the saw height is regulated to the desired plate thickness and the rotatable blade with the blank 7a is moved back, so that again a cup-shaped blank is sawed out and this time at the other side of the saw. The saw height is again adjusted until the blank 7a is cut. Then a new blank is formed.

Figure 4:
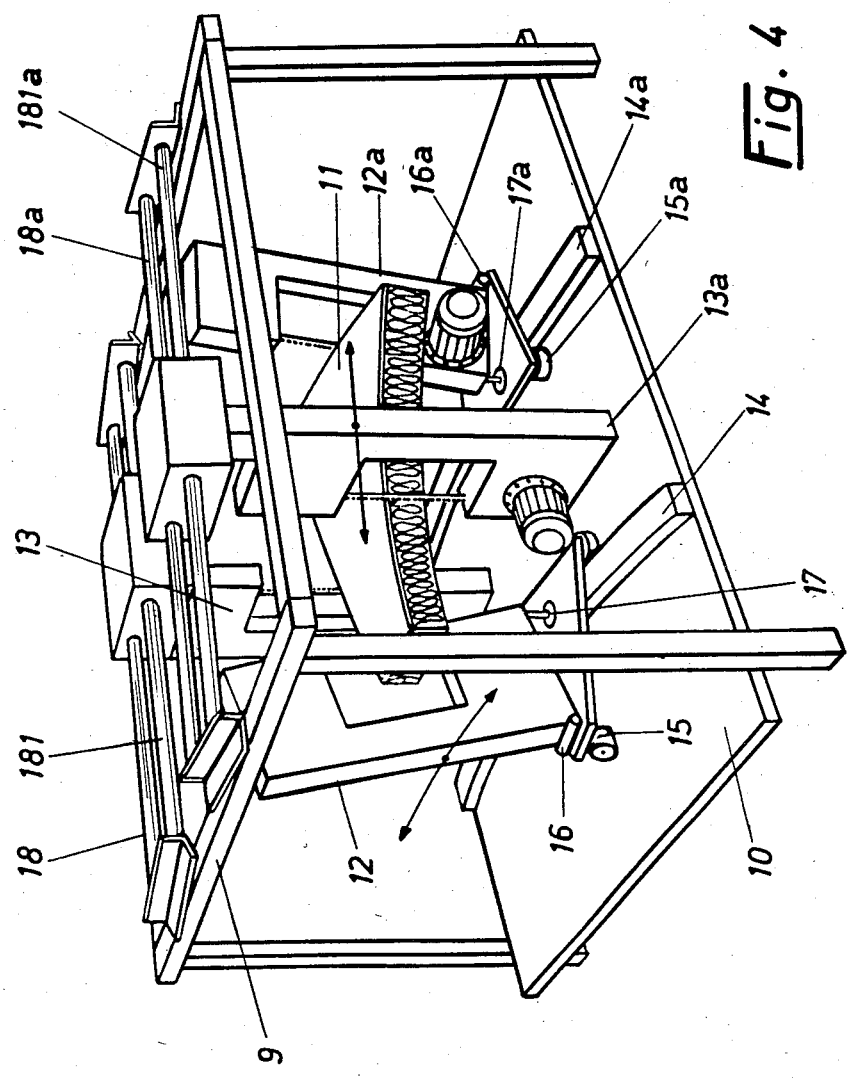
FIG. 4 is a view showing an arrangement for cutting joining surfaces of the curved blank, which forms another part of the equipment in accordance with the present invention.

FIG. 4 shows a second arrangement of the inventive joint arrangement, for cutting four joining surfaces of a wall portion which is shaped, for example, as a circular segment. The second unit has four posts supporting a four cornered frame 9 and a table 10 arranged in the lower region of the same. A cut bnalk 11 is supported within its inner side on the table 10 and fixed thereon. Two band saws 12 and 12a are movably arranged on the table 10 at two opposite sides of the latter. The band saws 12 and 12a are provided for cutting the wall portion along inner and outer circular lines of the circular segment. Two further band saws 13 and 13a are arranged at two other sides of the table 10 and are movably suspended from the frame 9. The band saws 13 and 13a are arranged for cutting the radial lines of the wall portion formed as a circular segment.

Two guiding rails 14 and 14a curved in accordance with the circular lines of the segment are changeably mounted on the table 10. The band saws 12 and 12a are provided with base portions 15 and 15a which are equipped with rollers and roll over the guide rails 14 and 14a.

The band saws 12 and 12a which are mounted in standing condition can be inclined within certain limits relative to their base portions 15 and 15a about axes 16 and 16a extending parallel to the cutting direction. Threaded spindles 17 and 17a fix the band saws 12 and 12a in each desired inclined position. The above-described adjustment of the inclination of these band saws is necessary inasmuch as the angle between the axes of rotation of the container to be insulated and the plane formed by the four corners of the respective cut blank (table plane) changes from segment to segment both for the identical radius of curvature and for other radii of curvature of the wall portions.

The band saws 13 and 13a provided for cutting the radial lines of the wall portions are suspended on the frame 9 in a substantially vertical position, each with the aid of a pair of guiding bars 18, 181 and 18a, 181a so as to move in the cutting direction of these band saws. The plane of at least one bar of each pair of the bars is inclindable relative to the plane of the other bar of the same pair and fixable in each desired inclination thereof. Thereby the planes of both bars of the same pair extend not parallel to one another, and as a result of this inclination of the respective band saw changes during the cutting process.

This is necessary inasmuch as the position of the cut blank which rests with its all four corners on the table, relative to the course of the edges angle does not correspond to its arrangement on the curved surface of the container to be insulated. The cutting edges extending along the radial lines must extend, relative to the plane of the table, in a helical manner, so that they correspond to the meridian plane on the outer surface of the container to be insulated.

It will be understood that each of the elements described above, or two or more together, may also find a useful application in other types of constructions differing from the types described above.

While the invention has been illustrated and described as embodied in an arrangement for manufacturing a curved wall portion of a heat insulating wall for a container having a curved surface, it is not intended to be limited to the details shown, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for manufacturing curved wall portions of a heat insulating wall for a container and particularly for cutting a block for a heat-insulating synthetic foam material with a contour embracing a section of a container surface to be insulated, the arrangement comprising a chain saw having a cutting tool which runs along an outer edge of a flexible web and has turning axes in which it is driven for running, said chain saw having two spaced ends; means for running said cutting tool along said outer edge of said flexible web of said chain saw and including two rotary elements; upright guiding elements each located at a respective one of the end of the chain saw and arranged to guide the latter for upward and downward movement between a plurality of vertical positions; means for displacing said chain saw in a vertical direction and including two displacing elements each arranged to act upon a respective one of the end of the chain saw in synchronism with one another and being parallel to said guiding elements; means for allowing the turning axes of the cutting tool of the chain saw to be inclined relative to one another and about a horizontal axis extending in a cutting direction between a plurality of inclined positions; and means for moving the block in vertical and horizontal directions relative to said chain saw.

2. An arrangement as defined in claim 1, wherein said rotary elements of said means for running said cutting tool along said outer edge of said flexible web of said chain saw are two electric motors.

3. An arrangement as defined in claim 1, wherein said cutting tool of said chain saw is formed as a wire.

4. An arrangement as defined in claim 1; and further comprising a frame mounting said chain saw and said guiding elements; and means arranged in said frame for clamping the block during its cutting to form the curved blank.

5. An arrangement as defined in claim 4, wherein said means for moving the blank includes a pair of guiding rails mounted on said frame and formed so that they are elongated in the cutting direction and curved in a vertical plane, and a plate member which supports the block and reciprocates over said guiding rails in the cutting direction.

6. An arrangement as defined in claim 5; and further comprising a table part provided in said frame and supporting said pair of guiding rails.

7. An arrangement as defined in claim 5, wherein said plate member has a plurality of rollers arranged to roll on said guiding rails for reciprocating said plate member thereover.

8. An arrangement as defined in claim 5, wherein said pair of guiding rails is mounted on said frame removable so as to be replaceable by another pair of guiding rails having different radii of curvature.

9. An arrangement as defined in claim 5, wherein the guiding rails of said pair are flexible in a vertical plane so that they can be deformed and thereby assume different radii of curvature.

10. An arrangement as defined in claim 5; and further comprising means for clamping the block on said plate member.

11. An arrangement as defined in claim 10, wherein said means for clamping the block is located under said chain saw.

12. An arrangement as defined in claim 11, wherein said means for clamping the block is located between said chain saw and said pair of guiding rails.

13. An arrangement as defined in claim 5, wherein said means for moving the block includes drive means located under said plate member and arranged for reciprocating the latter over said guiding rails.

* * * * *